United States Patent Office 3,442,325
Patented May 6, 1969

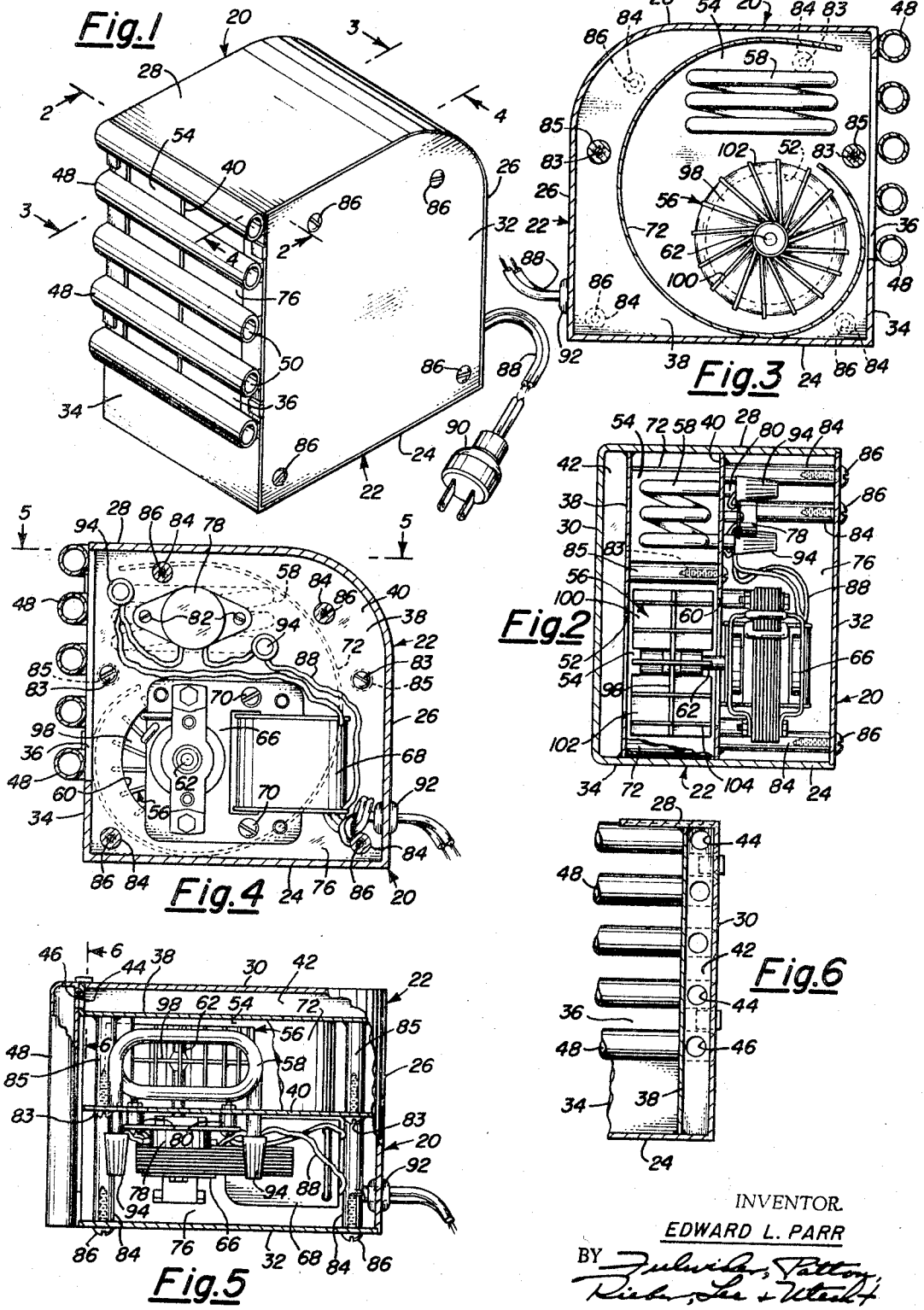

3,442,325
AIR COOLED HEATER GRILL
Edward L. Parr, El Cajon, Calif., assignor to Wendell L. Thompson, Burbank, Calif.
Filed Oct. 23, 1967, Ser. No. 677,151
Int. Cl. F24h 3/08
U.S. Cl. 165—39                    10 Claims

ABSTRACT OF THE DISCLOSURE

A heat generator including a casing having an air inlet and an air outlet with tubes forming a grill which spans the air outlet of the casing, which tubes are provided for supplying air to the air inlet. A dividing wall extends rearwardly from the front of the casing to divide the casing into an impeller and heating chamber and a motor chamber. This dividing wall, together with the impeller, the heater and the motor form a unit.

---

In practicing the present invention, I provide an open front casing, the open front providing a hot-air outlet for the casing. This outlet is substantially spanned by a grill formed of tubes which supply air to the air inlet of the casing. The casing contains means in the form of an impeller for drawing air into and expelling the air from the casing.

In the embodiment illustrated, the casing is provided with a wall which extends rearwardly from the open front to divide the casing into a heating and impeller chamber and a motor chamber; this wall is provided with an opening for the ingress of air to the heating chamber. An impeller and a heater are disposed on one side of the wall, i.e., in the heating and impeller chamber. The air inlet to the impeller is in open communications with the opening in the wall. A motor for driving the impeller is disposed on the opposite side of the wall, i.e., in the motor chamber.

Preferably the wall, the heater, the impeller, motor and a thermostat are in the form of a unit.

Other features and the advantages of the present invention will be apparent from the following description, reference being had to the accompanying drawing wherein a preferred embodiment of the invention is illustrated.

In the drawing:

FIG. 1 is a perspective view of the heat generator showing the front, the top and one side thereof;

FIGS. 2, 3 and 4 are sectional views taken along lines 2—2, 3—3 and 4—4, respectively, of FIG. 1;

FIG. 5 is a sectional view taken along line 5—5 of FIG. 4; and

FIG. 6 is a sectional view taken along line 6—6 of FIG. 5.

Referring more in detail to the drawing, the heat generator 20 includes a casing 22 having a bottom wall 24, a rear wall 26, a top wall 28, side walls 30 and 32 and a front wall 34. The upper part of the front wall is opened as at 36. The interior of the casing 22 is provided with two rearwardly extending dividing walls 38 and 40. The dividing wall 38 is permanently fixed to the bottom, top, front and rear walls and is disposed parallel with and adjacent side wall 30.

The left side, as viewed in FIG. 1, of the front wall 34 is provided with a plurality of holes 44 which are vertically lined, which holes register with holes 46 and a plurality of tubes 48. These tubes extend across the opening 36 in the front wall 34, preferably horizontally and the right ends of these tubes are open as at 50 for the ingress of air. Thus air is supplied to the chamber 42 through the tubes 48 and the tubes function as a grill for the front of the casing.

The wall 38 is provided with a relatively large opening 52 which interconnects chamber 42 with a heating and impeller chamber 54. This chamber is formed by dividing walls 38 and 40, the front wall 34, and a convolutely shaped wall 72. An impeller 56 and a heating coil 58 are disposed within the chamber 54. The dividing wall 40 is provided with an opening 60. These openings 52 and 60 are concentric with the shaft 62 of an electric motor 66, the stator of which is shown at 68. The motor 66 is attached to the dividing wall 40 by screws 70. As seen more clearly in FIGS. 2 and 5, the motor is disposed on the right side of the dividing wall 40 while the impeller and heater are disposed on the left side of that wall.

The dividing wall 40 together with the bottom wall 24, the rear wall 26, the top wall 28, the front wall 34 and the side wall 32, provide the chamber 76 for the motor 66 and for a thermostat 78. The thermostat is spaced from the wall 40 by sleeves 80 and is attached to that wall by screws 82 which pass through the sleeves 80. The thermostat is responsive to the temperature of the air in compartment 76 and provides for starting and stopping of the motor 66 and the energizing and de-energizing of the electric heater 58.

The wall 40 carries a plurality of elongated studs 84, which are preferably welded to the wall 40 and extend horizontally through the compartment 76. The wall is secured to the studs by screws 86.

Current conducting wires 88 lead from a plug 90 and extend through an insulating grommet 92 in the rear wall 26. These wires 88 are connected to the motor, the heater and the thermostat through terminal connectors 94.

The dividing wall 40, the thermostat 78, the heater 58, the impeller 56, the convolutely shaped wall 72, the motor 66 and the wall 32 are in the form of a unit. The unit is held in place by screws 83, the shank of which extends through the dividing wall 40 and are attached to studs 85, which studs are welded to dividing wall 38. By tightening these screws 83, the left edge of the convolute wall 72 is pressed against the dividing wall 38. After removing the wall 32, access is had to the screws 83 for removing the unit from the casing 22.

The impeller 56 is provided with a radially extending dividing wall 98. The dividing wall extends from the center of the impeller to the periphery of the blades 100. Thus the impeller 56 is in the form of two air impellers 102 and 104. When the motor is operated, air is drawn from the air inlet chamber 42 through the opening 52 in the wall 38, and air is drawn through the right side (as viewed in FIG. 1) of the opening 36 into the motor compartment or chamber 76 and thence through the opening 60 in the wall 40, by the impeller section 104. Thus the motor is maintained cool by the incoming cooler air.

One of the advantages of the present invention lies in the fact that the tubes 48 are maintained at a temperature below injury to a person's skin should the person contact the tubes, because the incoming air flowing through the tubes maintains the tubes at the below-injury temperature. Thus the tubes 48 form a grill for the front of the heater. Another advantage of the present invention lies in forming substantially the entire interior of the casing as a unit. The entire mechanism including the motor, the impeller, the heater and the thermostat can be assembled as a unit and inserted as such into the casing, and these elements also can be removed as a unit from the casing for repair.

While the form of embodiment herein shown and described, constitute preferred form, it is to be understood that other forms may be adopted falling within the scope of the claims that follow.

I claim:
1. A heat generator, comprising in combination:
  (A) a casing having:
    (1) an air inlet;
    (2) an air outlet;
  (B) means within the casing for drawing air into the inlet and forming air out of the outlet;

(C) a heater within the casing lying in the path of air flowing through the casing;

(D) and a plurality of tubes forming a grill substantially spanning the air outlet, said tubes each having:
(1) an air inlet;
(2) and an outlet connected with the air inlet (A)(1) of the casing.

2. A heat generator as defined in claim 1, characterized in that the air inlet (A)(1) to the casing is relatively long in one direction and relatively narrow in a transverse direction, and further characterized in that the outlets (D)(2) are connected with the air inlet (A)(1) of the casing along the length of the said air inlet (A)(1).

3. A heating system as defined in claim 1, characterized in that the air inlet (A)(1) to the casing extends rearwardly from the front of the casing, and further characterized in that the tubes extend in a horizontal direction.

4. A heat generator as defined in claim 1, characterized in that the casing is open at the front thereof and it includes:
(E) a dividing wall extending rearwardly, said wall forming an impeller and air heating chamber and motor chamber, and having:
(1) an opening;
and further characterized in that the means (B) for forcing the air is an impeller and is on one side of the wall (E) and is disposed to receive air from the opening (E)(1) and that the heater (C) is disposed on said one side;
and further characterized to include:
(F) a motor for driving the impeller, said motor being disposed on the opposite side of the wall.

5. A heat generator as defined in claim 4, characterized in that the wall (E), the impeller (B), the heater (C) and the motor (F) are in the form of a unit.

6. A heater generator as defined in claim 4, characterized to include:
(G) a thermostat for controlling the motor and heater, said thermostat being supported in the motor chamber.

7. A heat generator as defined in claim 4, characterized in that the open front of the casing provides the air outlet (A)(2) and provides an air inlet to the motor chamber.

8. A heat generator as defined in claim 4, characterized in that the wall (E), the impeller (B), the heater (C) and the motor (F) are in the form of a unit.

9. A heat generator as defined in claim 7, characterized in that the wall (E), the impeller (B), the heater (C) and the motor (F) are in the form of a unit.

10. A heat generator as defined in claim 7, characterized in that the tubes (D) substantially span the open front of the casing.

References Cited

UNITED STATES PATENTS 1,853,333  4/1932  Bates _____ 165—122
2,504,798  4/1950  Brinen _____ 165—122

ROBERT A. O'LEARY, Primary Examiner.

C. SUKALO, Assistant Examiner.

U.S. Cl. X.R.

165—122, 134; 219—369